March 2, 1926.
P. R. COLLIER
1,575,412
TILTING HEADLIGHT FOR AUTOMOBILES
Filed Sept. 5, 1923  2 Sheets-Sheet 2
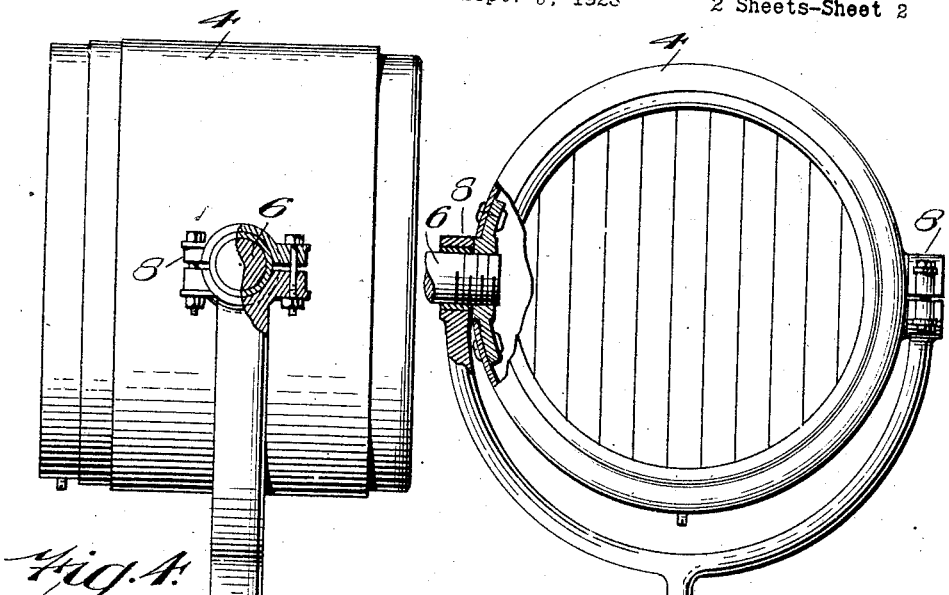
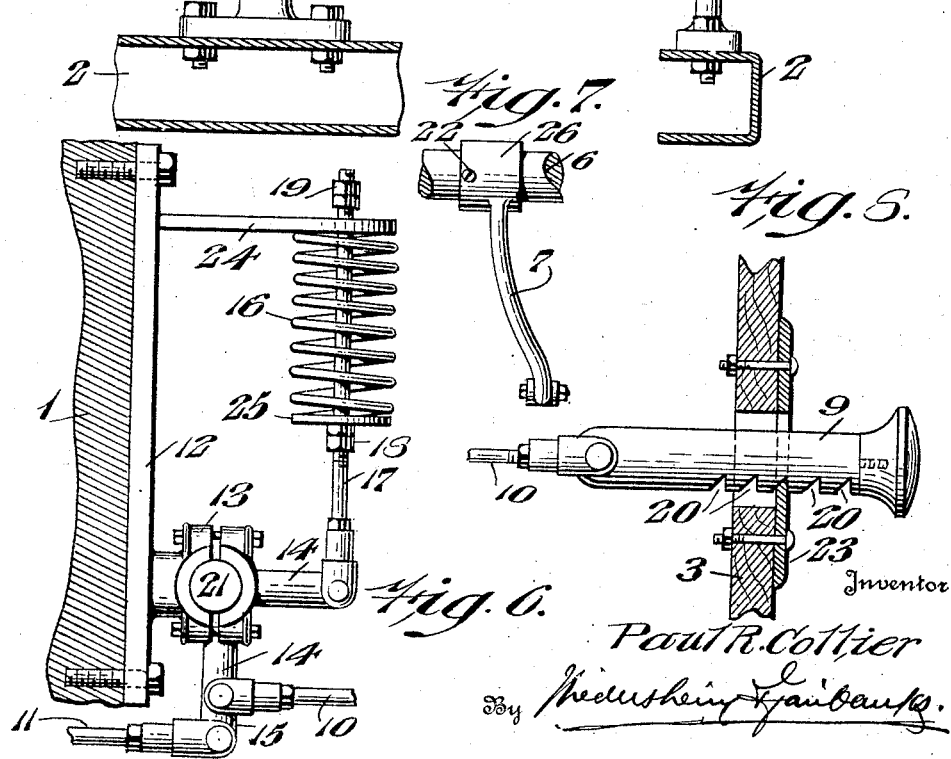
Inventor
Paul R. Collier
Attorneys Patented Mar. 2, 1926.

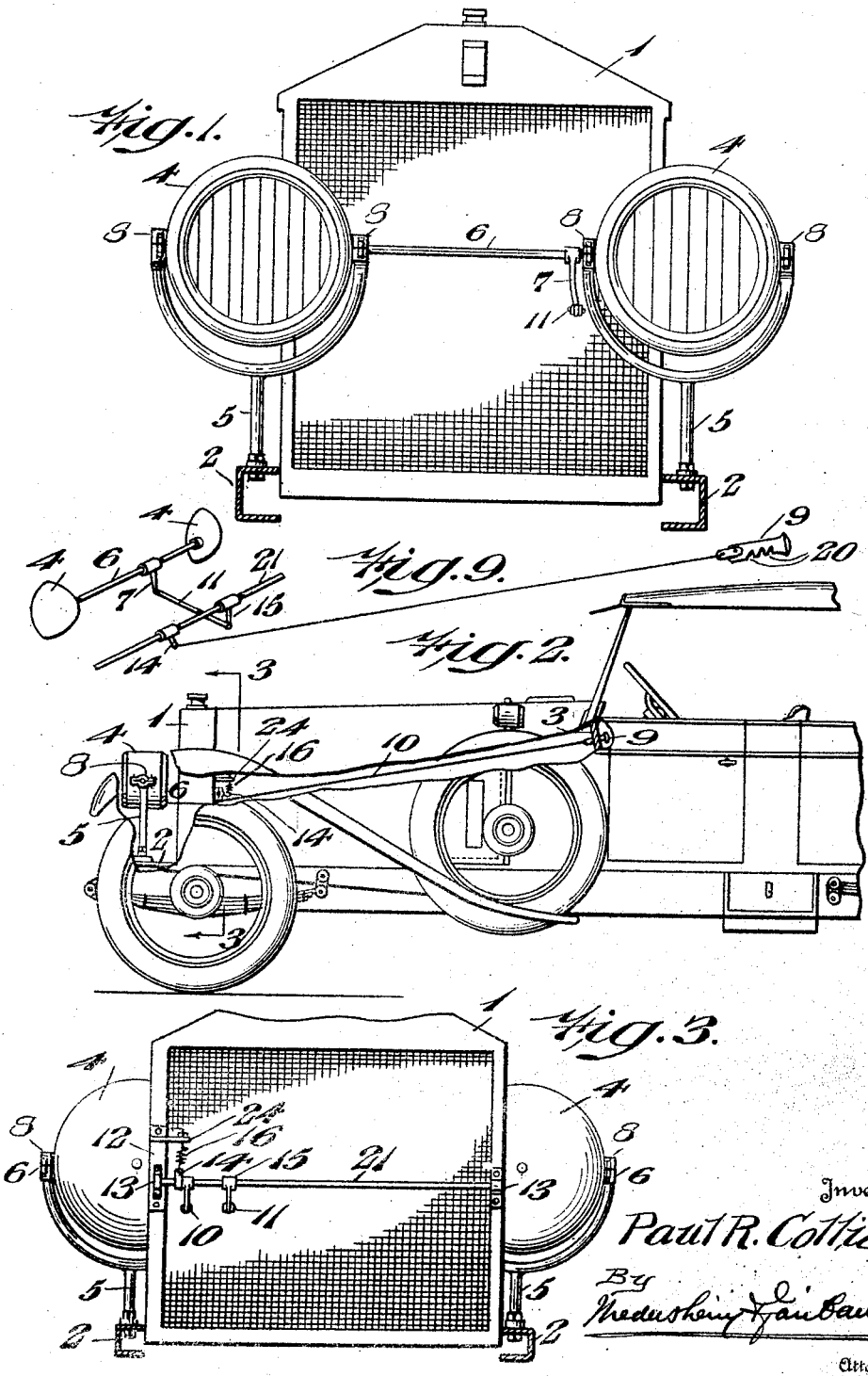

1,575,412

UNITED STATES PATENT OFFICE.

PAUL R. COLLIER, OF PHILADELPHIA, PENNSYLVANIA.

TILTING HEADLIGHT FOR AUTOMOBILES.

Application filed September 5, 1923. Serial No. 660,994.

*To all whom it may concern:*

Be it known that I, PAUL R. COLLIER, a citizen of the United States, residing in the city and county of Philadelphia, State of Pennsylvania, have invented a new and useful Tilting Headlight for Automobiles, of which the following is a specification.

My invention consists of a novel construction of tilting headlights for automobiles and novel actuating mechanism therefor, which is simple in construction, efficient in operation, and is not liable to get out of order, after installation and during use.

To the above ends my invention consists of a novel construction of tilting headlight mechanism, wherein I employ a front, horizontally disposed rod or shaft which is secured to the headlights in such a way that such rod and headlights rock or are actuated as a unit, said headlight rod having a pendant arm which is connected to an arm mounted on a horizontally disposed shaft positioned in the rear of the radiator, said latter shaft having connections leading to the instrument board or other desired part of the automobile, and being further provided with a novel tension or adjusting device whereby the position of the lamps and other coacting elements can be readily determined and adjusted.

It further consists of a novel construction of a headlight actuating mechanism of the character aforesaid, which can be readily installed in place with respect to any automobile radiator of any standard or conventional type.

It further consists of other novel features of construction and advantage all as will be hereinafter fully set forth, and particularly pointed out in the claim.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents an elevation, of the front of an automobile radiator, embodying my invention showing in section the side frames to which my invention is applicable.

Figure 2 represents a side elevation of my invention, certain parts being broken away for clearness of illustration.

Figure 3 represents a rear view of a radiator having my invention adapted thereto, the side frames being shown in section, the section being taken on line 3—3, Figure 2.

Figure 4 represents on an enlarged scale, a side elevation of one headlight, showing certain parts broken away to show the mounting thereof.

Figure 5 represents a front elevation of the right hand headlight, viewed from the front of the car, showing the manner of attaching its shaft and the manner of supporting the headlight from its side frame.

Figure 6 represents on an enlarged scale, an end view of the tension devices for the operating mechanism, seen at the left of Figure 3.

Figure 7 represents a front view of the headlight rod or shaft together with its actuating arm.

Figure 8 represents on an enlarged scale a sectional view of the instrument board, showing the operating mechanism, whereby the operator actuates the headlights and locks the same in the desired position.

Figure 9 represents a perspective, diagrammatic view, showing the connections common to the headlights, the rear shaft, and the manually operated lever therefor.

Similar numerals of reference indicate corresponding parts.

1 designates the radiator, 2 the frame or side channels, 3 the instrument board, 4 the lamps, and 5 the forked supporting brackets. 6 designates a horizontally disposed front shaft, 7 designates a tilting arm attached thereto having the head 26 provided with a set screw 22, 8 designates bearings for the headlight supports. 9 designates a hand lever having the ratchet teeth 20 in its under side, which engage the face plate 23, said hand lever being connected to the forwardly extending hand rod 10. 11 designates the link or lamp rod, and 12 a radiator bracket having the bearings 13 thereon, see Figures 3 and 6. 14 designates a spring crank and 15 the rear tilt arm, the manner of collocating the members 10, 11, 14 and 15 being apparent from Figures 6 and 9. 16 designates a spring through which the push rod 17 passes, the upper end of the latter passing through the arm 24, and carrying the adjusting nuts 19. The top of the spring 16 abuts against the under side of the arm 24 and its lower end abuts on the plate 25 supported on the adjusting nuts 18, carried by the push rod 17, whereby the tension of said spring 16 can be adjusted according to requirements.

21 designates a horizontally disposed shaft in the rear of the radiator 1 having its ends mounted in the bearings 13.

It will be seen from the foregoing that when the hand lever 9, which passes through the instrument board 3, is pulled towards the operator, so that a notch 20 interlocks with the face plate 23, that a pull is exerted on the rod 10, which rocks the crank 14 which is fast on the shaft 21 in the rear of the radiator, thereby rocking said shaft, and raising the rod 17, which carries the spring 16. Simultaneously the rod 15, whose upper end is fast to the shaft 21 is pulled backwardly, whereby a backward pull is exerted on the lamp rod 11, whose forward end is attached to the arm 7, which is secured fast to the front shaft 6, by the set screw 23, which causes the lamps 4 to tilt the lights below the horizontal or to assume such intermediate portions as may be desired, according to the position of the handle lever 9, and when the latter is released, the tension of the spring 16 restores all the parts to normal position. It will be noted that both the lamps or headlights 4 are secured directly to the front shaft 6, which is mounted in the bearings 8, so that said shaft and lamps rock as a unit. The nuts 19 best seen in Figure 6 can be adjusted up or down on the upper threaded end of the rod 17, thus limiting the maximum height of the lamps, while the lower nuts 18 adjust the tension of the spring 16. It will be noted that the arm 15 may be secured at any desired point on the rear shaft 21 and can be made fast thereon by a set screw of the character seen in Figure 7, said shaft being readily removable upon removing the caps of the bearings 13. The lamp supporting brackets 5 may be of different contour from that shown to adapt them for use upon different types of frames or chassis, as is evident. While I have shown the lever 9 as manually operated and mounted upon the instrument board, it will be apparent, that it can be foot operated if desired.

It will now be apparent that I have devised a novel and useful tilting headlight for automobiles which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim and desire to secure by Letters Patent is:

The combination of automobile side channels, a radiator supported with respect thereto, a pair of headlights, forked supports for said headlights carried by said side channels, a shaft for said headlights arranged in front of said radiator and having its ends directly connected thereto, so that the latter and said shaft function as a unit, bearings for said front headlight shaft, a pendant arm attached to said headlight shaft, a rear shaft rotatably mounted upon the rear of said radiator, a pendant arm connected to said rear shaft, a link common to said arms and passing through said radiator, a hand-pull connection controlled by the operator for rocking said rear and front shafts in unison to tilt said headlights and tension devices for resetting said rear shaft and its adjuncts, an apertured instrument board, and a face plate apertured in register with the instrument board aperture and fixed to said board, said connection having ratchet teeth thereon to be interlocked with the inner edge of the aperture of said face plate, whereby the headlights can be locked in the various extreme and intermediate positions they may assume.

PAUL R. COLLIER.